B. F. TAYLOR.

LOCOMOTIVE.

No. 11,438. Reissued Sept. 4, 1894.

Attest.
L. Lee.
Edw. F. Kinsey.

Inventor
Benjamin F. Taylor, per
Thomas S. Crane, atty.

THE NORRIS PETERS CO., PHOTO-LITHO., WASHINGTON, D.C.

UNITED STATES PATENT OFFICE.

BENJAMIN F. TAYLOR, OF NEWARK, NEW JERSEY, ASSIGNOR, BY DIRECT AND MESNE ASSIGNMENTS, TO THE TAYLOR IMPROVED DRAUGHT COMPANY, OF NEW JERSEY.

LOCOMOTIVE.

SPECIFICATION forming part of Reissued Letters Patent No. 11,438, dated September 4, 1894.

Original No. 471,281, dated March 22, 1892. Application for reissue filed June 8, 1894. Serial No. 513,969.

DIVISION B.

*To all whom it may concern:*

Be it known that I, BENJAMIN F. TAYLOR, a citizen of the United States, residing at Newark, Essex county, New Jersey, have invented certain new and useful Improvements in Locomotives, fully described and represented in the following specification and the accompanying drawings, forming a part of the same.

The object of this invention is to relieve the piston as much as possible from atmospheric pressure and to destroy the smoke, gases, and cinders, by the introduction of air into the exhaust pipe and smoke stack, impelled by the speed of the locomotive.

The invention consists in the arrangements and combinations of certain devices to secure these results, as herein set forth, and finally pointed out in the claims.

Figure 1:
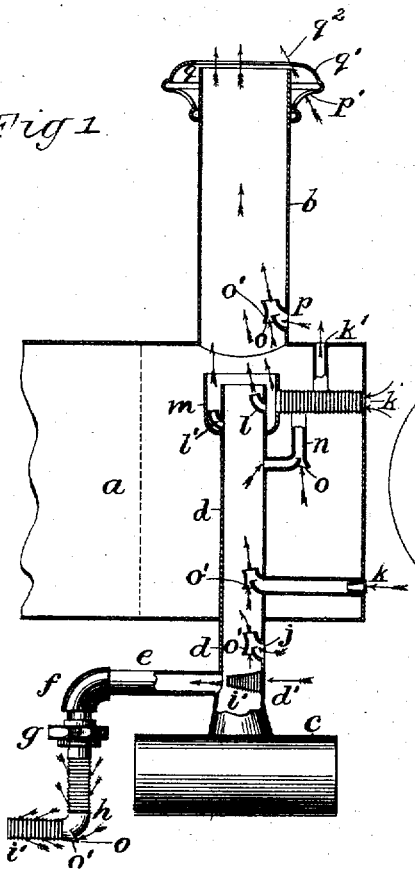
Figure 2:
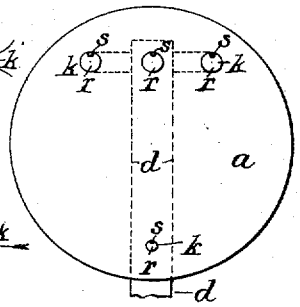

Referring to the accompanying drawings, in which similar letters of reference indicate corresponding parts wherever they occur, Figure 1 represents a central longitudinal section of a locomotive boiler, smoke stack, exhaust pipe, cylinder, &c.; and Fig. 2 is a front end elevation of the same.

In said drawings, *a* indicates the boiler, *b* the smoke stack, *c* the cylinder, and *d* the exhaust pipe.

In carrying out my invention, I tap the exhaust pipe, preferably in front at *d'* below the smoke box, if it can be done at that point, and if not, at the most favorable point allowable to utilize the benefit of the current of air produced by the speed of the engine, and attach an outlet pipe *e* to the exhaust pipe in the rear, or opposite the inlet *d'*. If the mouth or end of said outlet be obstructed by any portion of the locomotive, I attach an elbow *f* thereto and carry it downward or to one side, by means of a union coupling forming a swivel-coupler *g*, so as to afford a free and unobstructed passage and escape for the air and steam, as indicated in Fig. 1. At the bottom of said elbow, if desirable, I form another elbow *h* with an opening *o* at the joint to further admit a current of air thereat. At the inner portion of said inlet pipe and the outer extremity or portion of said elbow, I also form a series of funnel shaped openings *i'*, the design of which is to create a stronger draft and suction in order to more thoroughly vaporize the steam and to increase to the utmost the draft of air to mingle with and draw the exhaust steam from the exhaust pipe, and to thereby decrease the atmospheric pressure upon the piston as much as possible. Arrows are shown indicating the movement of the air in the pipes and funnel-shaped openings. As a further means of aiding to secure these results, I tap the exhaust pipe at different points above that above described, either below the smoke box, as indicated at *j*, Fig. 1, if it be admissible, or if not, above the lower line of the boiler, or both, as indicated by the inlet pipe or pipes (as there may be several) *k*, which pass through the front end of the smoke box to said exhaust pipe, or to a chamber formed around the top of the same, as shown in Figs. 1 and 2. The inner ends of said inlet pipes may be curved upward if desired within such exhaust pipe or chamber, the object being to introduce a strong draft of air to help carry the exhaust steam, if there be any, out through the smoke stack, and also to condense the steam and to mingle the air with the gases and smoke, to destroy them as far as possible. These pipes may enter from the side or top of the smoke box, as indicated at *k'*, if there be no room in the front end.

An air chamber *m* is shown formed around the exhaust pipe in Fig. 1, and connected with the inlet *k* which is formed with funnel-shaped openings.

Two pipes or elbows *l*, *l'*, connect the interior of the chamber *m* with the inside of the exhaust pipe, the elbow *l* leading the air from the chamber into the pipe, while the elbow *l'* leads the steam from the pipe into the air chamber; the mingling of the air with the steam resulting in both cases.

An elbow *n* is connected with pipe *k* and with the exhaust pipe, and formed with an opening *o* at the bottom to admit smoke and gases from the smoke box, which are thus mingled with the air and steam, and are expelled through the smoke stack.

The chamber $m$ extends a little above the top of the exhaust pipe $d$, and being annular in form projects an annular current of air upward around the mouth of such pipe, thus assisting the discharge of the steam without penetrating the interior of the pipe. The air chamber thus promotes the discharge and condensation of the steam without obstructing the interior of the pipe $d$, as in the case of the elbow $l$, and upon the inlets $j$ and $k$. As a still further means of promoting these results, I also tap the smoke stack at one or more points, in the present case at or near the bottom and top at $p$ and $p'$ the latter connecting with an air chamber $q$, which is formed around the upper end of the stack, as shown in Fig. 1.

The inlet at $p$ is provided with a curved pipe or elbow projected inwardly and upwardly from the side of the stack, and such inlet pipe is provided upon its side with an opening or passage $o$. Such opening, like the opening $o$, in the pipes $n$ and $h$, is provided upon its outer side with a lip $o'$ to direct a portion of the rising steam and smoke into such opening to mingle it with the current of air inside such pipe. An arrow is shown entering the opening $o$ to indicate such movement toward the interior of the pipe.

The chamber $q$ is shown of annular form extending around the entire top of the stack and is provided with a cover $q'$ which is projected inwardly toward the top of the stack, and diffuses the air around the top of the same before its discharge. The cover also directs the air inwardly around the top of the stack, as indicated by the arrow $q^2$; thus mingling such air current intimately with the rising smoke and steam. The effect of the inrushing air at these several points when a locomotive is rushing at full speed, in securing the results mentioned will be obvious. These inlets or any of them may be provided with automatic valves $r$, which in this case are plain or flat disks suspended at the entrance by a pivotal connection $s$ and swing inward automatically when the locomotive is in motion, and when at rest and in getting up steam these valves will be closed automatically, so as not to deleteriously affect the draft, as will be understood. The location and construction of these several devices may be varied to suit the different styles of locomotives, as will be understood.

It has been common in chimney pots and ventilators to surround the vent or top of a pipe with a series of inclined slats open upon all sides for the access of air; but the chamber $q$ at the top of the stack, described herein, is readily distinguished from such constructions, as it is a closed chamber with opening at the front side only; the walls of the chamber serving to distribute the air which enters such opening around the entire top of the stack.

Having thus described my invention, what I claim, and desire to secure by Letters Patent of the United States, is—

1. A smoke or exhaust pipe provided with an aperture in the side and having an elbow projected inwardly and upwardly from such aperture and formed upon its under side with an opening or passage $o$, having the lip $o'$ projected upon its outer side to direct a portion of the smoke or steam into the opening $o$, substantially as herein set forth.

2. The combination, with a chimney stack, of an air inlet pipe projected inwardly and upwardly from the side of the same, and provided upon its under side with an opening or passage, the whole arranged and operated to introduce a current of air within the stack and to intercept a portion of the rising steam or smoke, and mingle the same with the air current inside such pipe, substantially as herein set forth.

3. In a locomotive, the combination with the chimney stack $b$, of the annular air chamber $q$ formed around the upper end of the stack upon its outer side, such chamber being inclosed upon all sides excepting the front, and having the open air inlet $p'$ upon such front side below the top of the stack, as and for the purpose set forth.

4. In a locomotive, the combination with the chimney stack $b$, of the annular air chamber $q$ formed around the upper end of the stack upon its outer side, such chamber provided with the cover $q'$ directed inward toward the top of the stack, and the chamber being inclosed upon all sides excepting the front, and having the open air inlet $p'$ upon such front side below the top of the stack, as and for the purpose set forth.

5. The combination, with an exhaust pipe, of an annular air chamber sustained around the mouth of the pipe and projected above the top of the same, such chamber having an air inlet supplying air thereto and the chamber directing an annular current of air around and above the mouth of the pipe, substantially as herein set forth.

In testimony whereof I have hereunto set my hand in the presence of two subscribing witnesses.

BENJAMIN F. TAYLOR.

Witnesses:
THOMAS S. CRANE,
L. M. SHIELDS.